3,535,173
HIGH-ENERGY PLASTISOL COMPOSITES CONTAINING NITROPOLYURETHANE RESINS PLASTICIZED WITH POLYDI-FLUOROAMINO COMPOUNDS
Lawrence Spenadel, Fanwood, and Herman Bieber, Kenilworth, N.J., assignors to Esso Research and Engineering Company, a corporation of Delaware
No Drawing. Filed Dec. 21, 1960, Ser. No. 77,470
Int. Cl. C06d 5/00
U.S. Cl. 149—18                 5 Claims This invention relates to high energy plastisol propellants for rockets using, as plasticizing liquid, high-energy substances that contain preferably as much as one $NF_2$ group per carbon in a molecule having from 2 to 8 carbon atoms. This liquid is described herein as a liquid oxidizer containing $CNF_2$ groups.

As a means of preparing rocket propellant grains from high-energy ingredients that contain the necessary fuel and oxidizing constituents, plastisols have advantages in safety for ease in handling. The high-energy ingredients are substances which have high heats of combustion, i.e. above 1000 calories per gram, preferably above 1500 calories per gram.

A plastisol is a mixture of solid and liquid ingredients that have proper mutual solubility under the conditions of mixing to form a fluid or semi-fluid mass which then becomes transformed into a solid gel having requisite minimum rubbery properties of tensile strength and elongation under suitable conditions. It is desirable to be able to to prepare the mixture of solid and liquid even in conventional glass apparatus with safety so that the mixture can be prepared without need of heavy equipment constructed of metal and so that the mixing can be carried out conveniently at a distance from where the mixture is poured or shaped into the propellant grain. After mixing the solid and liquid ingredients, the fluid or semi-fluid mixture is advantageously of a consistency so that it can be piped into a rocket motor case or any mold. The casting or molding is followed by curing into the solid gel.

Handling is simplified by having the plastisol mixture sufficiently fluid until the casting operation. Homogeneous distribution of the ingredients is also thus enhanced. The fact that no heavy mixers, extruders or mills are needed eliminates a major hazard, because with heavy equipment, thermal build-up or ignition is more apt to occur followed by severe pressure build-up which gives rise to explosion and shooting out of fragments of metal at high speed. By being able to use light mixing apparatus, such as glass apparatus and low temperatures, the risk of heat build-up is reduced and if ignition occurs, the apparatus breaks up letting the resulting mixture burn relatively slowly at atmospheric pressure. The present invention is based on the discovery and finding that liquid oxidizers containing a multiplicity of $CNF_2$ groups, e.g. 2 to 8 $CNF_2$ groups can plasticize a wide variety of high-energy polymeric binders as well as some ordinary finely-divided hydrocarbon polymers to form the plastisol mixtures that can be used safely and conveniently for making the rocket propellant grains of prime interest. The liquid oxidizers may have both $CNF_2$ and $CNO_2$ groups and preferably they should have at least one energy imparting group, $NO_2$ or $NF_2$, attached to each carbon atom. These liquid oxidizers have desired low volatility, e.g. a vapor pressure of less than 15 mm. Hg and preferably less than 1 mm. Hg at 25° C.

An increased advantage is attained through this invention in using high-energy polymeric binders having nitro groups, $NF_2$ groups or both of these as constituents, preferably one of such groups for every 2 carbon atoms. For instance, nitro cellulose is one kind of high-energy polymeric solid which is typified as having interlinked carbons in a chain and as having a number of nitro groups distributed along the chain. Nitropolyurethane is another high-energy polymer containing nitro groups distributed along the chain. $NF_2$ rubbers are solid, high-energy polymers having $NF_2$ groups distributed along the chain. These polymers are desirable ingredients for a propellant system in which other solid ingredients, such as reactive finely-divided metals and oxidizing salts are to be used. These $NF_2$ polymers are often crystalline in nature, and plasticization is necessary to impart desirable physical properties to the propellant.

Examples of low-energy solid polymers that may be used in making plastisol propellants include rubbery hydrocarbon polymers, some with halogen atoms attached to the carbons in the chain. In making a high-energy propellant, these materials which have been known conventionally as binders are preferably kept to a minimum. These conventional low-energy binding substances in general have a carbon-to-carbon chain nucleus or backbone and an average molecular weight above 1000. In addition to natural rubber, these materials include polybutadiene resin, butadiene-styrene resin, polybutadiene rubber, polyisoprene rubber, polychloroprene rubber, styrene-butadiene rubber, isopreneisobutylene rubber, polyhexadiene rubber. These polymers are unsaturated and can be reacted with halogens, hydrogen, and other reagents. Generally, these polymers when solid have molecular weights of about 10,000 to 200,000 and softening points above 32° C.

To form the high-energy polymers, the mentioned unsaturated rubbery polymers are reacted with tetrafluorohydrazine to add difluoramino, $NF_2$, groups. The difluoramino adducts of the unsaturated hydrocarbon polymers can in turn be reacted with nitrogen dioxide or its dimer to form polymeric compounds containing both nitro radicals and difluoramino radicals. The thus modified polymers which have been developed as oxidizer binders are compatible with the liquid acyclic and cyclic compounds containing $CNF_2$ groups used as plasticizers for making the desired plastisols. Another kind of oxidizer binder which can be plasticized as herein described to make the desired plastisols is the polymer known as nitropolyurethane which has the following empirical formula:

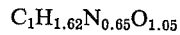
$$C_1H_{1.62}N_{0.65}O_{1.05}$$

As in the case of the nitrocellulose polymer, it was unexpectedly found that the high-energy polymers containing nitro groups along the chain have compatibility with the liquid compounds that have a high proportions of $NF_2$ groups to carbon.

The kinds of oxidizer binders that have been described are not in themselves a novel part of the invention. They serve as gelling agents with the liquid oxidizer compounds containing $CNF_2$ groups as the plasticizers in preparing the plastisols. In making up the mixture of the oxidizer binder or gelling material with the plasticizer, various compatible solid fuels and solid oxidizing agents in finely divided or powdered form can be added, for example, powdered aluminum, powdered beryllium, hydrazine diborane, metal hydrides, hexanitroethane, ammonium perchlorate, hydrazinium nitroformate, etc. These additional solid powders are used in suitable proportions for obtaining the desired density and stoichiometric balance of the ingredients. In the general procedure of preparing the plastisol formulation the liquid $NF_2$ oxidizer is added to the finely-divided oxidizer binder or high-energy polymer and mixed well. Then the solid ingredients, such as powdered metal and powdered solid oxidizer, are admixed to obtain a mud-like mixture. The mixture is preferably free of gas, e.g. by applying vacuum at a suitably low temperature. Finally the mixture is cast and in a period of time sets up into a hard gel or plastisol. Moderate heating (up to 100° C.) may be required during the curing step, depending on the particular system used.

The high energy liquid substances containing a high $NF_2$ to carbon ratio include a variety of adducts of $N_2F_4$ and diolefinic, olefinic, polyene and heterocyclic oxygen compounds. These adducts are typified by $C_3H_5(NF_2)_3$, $C_4H_6(NF_2)_4$, $C_4H_5F(NF_2)_4$, hexakis difluoramino hexane, and tetrakis (difluoramino) tetrahydrofuran, which is a cyclic ether having four $CNF_2$ groups, and other liquid adducts of unsaturated hydrocarbons or heterocyclic oxygen compounds containing $NF_2$ attached to the carbons in the nucleus, such compounds containing 2 to 8 carbon atoms, 1 to 2 oxygen atoms, and 2 to 8 $NF_2$ groups.

The liquid oxidizers containing $CNF_2$ groups have been found to have high specific impulse (Isp) ratings, i.e. high thrust in pounds per second per unit weight of the material. They have been demonstrated in accordance with the present invention to be especially useful as the plasticizers of high-energy polymers containing $CNF_2$ and $NO_2$ groups in making the desired plastisols. The liquid oxidizers containing $CNF_2$ groups soften these resinous high-energy polymers to obtain a composite which is more flexible, and tougher when set by forming and shaping. The resulting composites have desired high specific impulse and density characteristics. Representative plastisol formulations are set forth in the following examples:

EXAMPLE 1

| | Wt. percent |
|---|---|
| $C_{1.839}O_{3.769}N_{1.073}$ (58.82% nitrocellulose - 41.18% nitroglycerine) | 10.86 |
| Boron | 11.75 |
| $NH_4ClO_4$ ammonium perchlorate | 41.70 |
| $C_3H_5(NF_2)_3$ trisdifluoroamino propane | 35.69 |

EXAMPLE 2

Using $C_3H_5(NF_2)_3$ of 1,2,3 - tris - (difluoroamino) propane as the plasticizing ingredient, it is mixed with nitropolyurethane having the formula $C_1H_{1.62}N_{0.65}O_{1.05}$ and with ammonium perchlorate in the following composition proportions:

| Ingredient: | Wt. percent |
|---|---|
| Nitropolyurethane | 29.4 |
| Ammonium perchlorate | 21.8 |
| Trisdifluoramino propane | 48.8 |

The resulting mixture cured readily at 45° C., possessed desired rubbery properties. Advantageously, the $NF_2$ liquid oxidizer did not interfere with the free radical cure of the polyurethane. The composite has an Isp of 267. It was cast into strands, and will burn under pressure at satisfactory rates of 1 to 2 inches per second.

EXAMPLE 3

A formulation was made up of the nitropolyurethane resin, the trisdifluoramino propane and hexanitroethane. Using 15 wt. percent of the resin and 54 wt. percent of the liquid $NF_2$ oxidizer, the final gel was relatively soft. However, tensile strength can be increased if desired by using a lower ratio of the plasticizer to the polymer.

EXAMPLE 4

Using polybutadiene-$N_2F_4$ adduct of recurring unit formula $[-C_4H_6(NF_2)_2-]_n$ as the high-energy polymer to be plasticized, tetrakis difluoramino butane, $C_4H_6(NH_2)_4$, is used as the high-energy liquid oxidizer and plasticizer. Data was obtained on such a system in which 30 volume percent of the polymer is employed together with powdered boron and solid hexanitroethane oxidizer in balanced amounts for complete combustion. The specific impulse obtainable is in the range of 282 to 292 for the resulting plastisol. Similarly, suitable high-energy plastisols are obtainable when the liquid oxidizer and the binder have varying proportions of fluorine substituted for hydrogen. Although the specific impulse is reduced by increasing the C-F bonds, the increased density gives an improvement in overall performance.

EXAMPLE 5

Using 34.9 wt. percent of the polybutadiene-$NF_2$ adduct polymer having an average molecular weight of about 15,000, 23.7 wt. percent of tetrakis difluoramino tetrahydrofuran is used as plasticizer and 41.4 wt. percent ammonium perchlorate powder is admixed as oxidizer to obtain a suitable plastisol.

EXAMPLE 6

Using 32.2 wt. percent of the polybutadiene-$NF_2$ adduct polymer, 10.2 wt. percent trisdifluoramino propane as the plasticizer, 10.6 wt. percent finely-divided beryllium as the fuel, and 47.0 wt. percent hexanitroethane as the oxygen oxidizer, a hard gel-like propellant was obtained.

The propellant had a theoretical specific impulse of 295 and burned at 1"/sec. at 500 p.s.i.

The rubbery plastisols obtained in the manner described should have a tensile strength above 20 pounds per square inch and elongation of over 10% as minimum requirements of stiffness and elasticity, preferably at least 50 p.s.i. at 30%. However, if the gel is on the soft side, various reenforcing fibrous materials, e.g. aluminum wool, or fibers of other fuel ingredients, added to the composite to be distributed throughout the plastisol may be used for adding rigidity. Also, stiffness is imparted to the composition by increasing the amount of the high-energy polymer in proportion to the liquid plasticizer.

An important advantage of using the $CNF_2$-containing liquid oxidizer compounds for plasticizing the polynitro and polydifluoramino polymers is that the mixing, handling and curing can be carried out at ordinary temperatures and relatively low temperatures in the range of about 20° C. to 60° C.

Among other useful liquid $CNF_2$ oxidizers suitable as plasticizers of the high-energy polymer binders in forming the plastisols are compounds containing more than 1 $NF_2$ group per carbon atom, e.g. pentakis $(NF_2)$ tetrahydrofuran, and liquid oxidizers containing both $NF_2$ and $NO_2$ energy groups. Preferably, said liquid oxidizers contain 3 to 8 carbon atoms with at least the same number of energy groups attached.

The high-energy polymers containing $NO_2$, $NF_2$, or both kinds of groups may constitute from 5 to 50 wt. percent of the total composite, preferably 10 to 30 wt. percent, the higher amount being permissible if the energy value of the polymer is higher. The liquid oxidizer used as plasticizer to form the plastisol with a high energy polymer in the propellant composite may be 10 to 80 wt. percent of the polymer or more usually 20 to 50 wt. percent thereof.

The invention is intended to include modifications and equivalents coming within the scope and spirit of the invention described.

What is claimed is:

1. A high-energy plastisol composite containing 5 to 50 wt. percent of nitropolyurethane resin plasticized by a $C_2$ to $C_3$ liquid oxidizer containing $NF_2$ groups linked to each carbon atom of a polydifluoramino alkane.

2. A high-energy plastisol composite containing 5 to 50 wt. percent of a high-energy polymer selected from the group consisting of nitrocellulose, nitropolyurethane, and polybutadiene-$N_2F_4$ adduct, and containing as plasticizer a high-energy liquid organic oxidizer having from 2 to 8 carbon atoms per molecule with an $NF_2$ group linked to each carbon atom in the molecule.

3. A high-energy plastisol composite containing 5 to 50 wt. percent of nitrocellulose plasticized by a liquid organic oxidizer containing 2 to 8 carbon atoms per molecule and an $NF_2$ group linked to each carbon atom in the molecule.

4. A high-energy plastisol composite containing 5 to 50 wt. percent of polybutadiene-$N_2F_4$ adduct having the recurring unit $$[-C_4H_6(NF_2)_2-]$$

and containing as plasticizer a liquid organic oxidizer having 2 to 8 carbon atoms per molecule and an $NF_2$ group linked to each carbon atom in the molecule.

5. A high-energy plastisol composite comprising 5 to 50 wt. percent of nitrocellulose plasticized by a $C_2$ to $C_8$ liquid organic oxidizer containing an $NF_2$ group linked to each carbon atom of a polydifluoramino alkane.

References Cited

Baehringer, Missile Design and Development, vol. 6, September 1960, pp. 23–26.

Baehringer, Missiles and Rockets, vol. 5, No. 5, Jan. 2, 1959, p. 36.

Farber, Astronautics, vol. 5, No. 8, August 1960, pp. 34, 40 and 42.

BENJAMIN R. PADGETT, Primary Examiner

U.S. Cl. X.R.

149—19, 20, 36, 94, 95, 96, 97, 100